United States Patent
Amit et al.

(10) Patent No.: US 8,935,304 B2
(45) Date of Patent: *Jan. 13, 2015

(54) EFFICIENT GARBAGE COLLECTION IN A COMPRESSED JOURNAL FILE

(71) Applicant: International Business Machines Corporation, Armonk, NY (US)

(72) Inventors: Jonathan Amit, Omer (IL); Chaim Koifman, Rishon Lezion (IL); Sergey Marenkov, Yehud (IL); Rostislav Raikhman, Rishon Lezion (IL)

(73) Assignee: International Business Machines Corporation, Armonk, NY (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/789,067

(22) Filed: Mar. 7, 2013

(65) Prior Publication Data

US 2013/0185338 A1      Jul. 18, 2013

Related U.S. Application Data

(63) Continuation of application No. 13/275,178, filed on Oct. 17, 2011, now Pat. No. 8,539,007.

(51) Int. Cl.
*G06F 17/30* (2006.01)
*G06F 3/06* (2006.01)
*G06F 12/02* (2006.01)

(52) U.S. Cl.
CPC ............ *G06F 12/0253* (2013.01); *G06F 3/064* (2013.01); *G06F 3/06* (2013.01); *G06F 3/0689* (2013.01); *G06F 3/0652* (2013.01); *G06F 17/30191* (2013.01); *G06F 3/0608* (2013.01); *G06F 17/30138* (2013.01)

USPC ......................................................... 707/813

(58) Field of Classification Search
USPC ......................................................... 707/813
See application file for complete search history.

(56) References Cited

U.S. PATENT DOCUMENTS

| 7,610,442 | B2 | 10/2009 | Kim et al. |
| 2003/0120869 | A1 | 6/2003 | Lee et al. |
| 2006/0036802 | A1 | 2/2006 | Drukin |
| 2008/0071723 | A1 | 3/2008 | Joshi et al. |
| 2008/0168213 | A1 | 7/2008 | Kim |
| 2008/0235306 | A1 | 9/2008 | Kim et al. |
| 2009/0300086 | A1 | 12/2009 | Bacon et al. |

(Continued)

FOREIGN PATENT DOCUMENTS

WO      2007019197  A1      2/2007

OTHER PUBLICATIONS

Blackburn et al., Immix: A Mark-Region Garbage Collector with Space Efficiency, Fast Collection, and Mutator Performance, PLDI '08, 2008.*

(Continued)

*Primary Examiner* — William Spieler
(74) *Attorney, Agent, or Firm* — Griffiths & Seaton PLLC

(57) ABSTRACT

A map corresponding to data blocks with overwritten compressed journal entries is configured. Weighted conditions for each of the overwritten compressed journal entries are calculated. The weighted conditions are arranged in the map from lowest to highest. One of the weighted conditions includes a biasing variable towards selecting data blocks having free space at an end of at least one associated record.

8 Claims, 6 Drawing Sheets

(56) References Cited

U.S. PATENT DOCUMENTS

2009/0327591 A1  12/2009  Moshayedi
2010/0057976 A1   3/2010  Lasser
2010/0325351 A1  12/2010  Bennett
2011/0029715 A1   2/2011  Hu et al.
2011/0055455 A1   3/2011  Post et al.
2011/0055458 A1   3/2011  Kuehne
2011/0066789 A1   3/2011  Wakrat et al.
2011/0225346 A1   9/2011  Goss et al.

OTHER PUBLICATIONS

Sohyang Ko et al., "Study on Garbage Collection Schemes for Flash Based Linux Swap System," 2008 Advanced Software Engineering & Its Applications, IEEE 978-0-7695-3432-9/08, 2008, 4 pages.

IBM et al. "Method of Use Register Allocation to Reduce the Size of Data Required for Garbage Collection", IPCOM000006431D, Jan. 2, 2002, 3 pages.

* cited by examiner

400

1. FULL BLOCK OF DATA

Segments 1,2,3,4 were originally written together so they will be in cache together

2. OVERWRITE OF SEGMENT 2

Segments 1,3 and 4 need to be relocated - this can be easily achieved as they are in cache (because since 2 was recently modified all segments that make up the block will be in cache)

3. INITIAL BLOCK IS NOW FREE

Original segments 1,3 and 4 are relocated (grouped) with the I/O of write 85

FIG. 4

EFFICIENT GARBAGE COLLECTION IN A COMPRESSED JOURNAL FILE

CROSS REFERENCE TO RELATED APPLICATIONS

This application is a Continuation of U.S. patent application Ser. No. 13,275,178, filed on Oct. 17, 2011.

BACKGROUND OF THE INVENTION

1. Field of the Invention

The present invention relates generally to computers, and more particularly, to efficient garbage collection in a compressed journal file in a computing environment.

2. Description of the Related Art

In today's society, computer systems are commonplace. Computer systems may be found in the workplace, at home, or at school. Computer systems may include data storage systems, or disk storage systems, to process and store data. The data can be lost due to problems such as system crashes, hardware failures, and abnormal computing system halts. Journaled file systems can be used to maintain data integrity when these types of problems occur. Journaled file systems maintain file system integrity by recording information regarding updates to directories, bitmaps, and/or data, in a log, also called a journal, before the updates are written to a storage device such as a hard disk. In the event of a system crash or other problem, the information in the journal can be used to restore the file system to a consistent state. Full-journaling file systems additionally perform data journaling, in which data updates are also stored in the journal, to ensure that no committed data is lost.

SUMMARY OF THE DESCRIBED EMBODIMENTS

In a data processing system or computing environment, a journaling file system may be used to store the write operations in a journal. In a compressed journal file system the journal holds compressed data. When an overwrite operation is performed, the overwrite operation of the data invalidates an old record and creates a hole in the journal. As a result, efficiency and productivity may be reduced.

Accordingly, and in view of the foregoing, various exemplary method, system, and computer program product embodiments for efficient garbage collection in a compressed journal file system are provided. In one embodiment, by way of example only, a map corresponding to data blocks with overwritten compressed journal entries is configured. Weighted conditions for each of the overwritten compressed journal entries are calculated. The weighted conditions are arranged in the map from lowest to highest weight. One of the weighted conditions includes a biasing variable towards selecting data blocks having free space at an end of at least one associated record.

In addition to the foregoing exemplary method embodiment, other exemplary embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 4 illustrates an exemplary block diagram showing garbage collection in a compressed journal file;

DETAILED DESCRIPTION OF CERTAIN EMBODIMENTS

In a data processing system or computing environment, a journaling file system may be used to store the write operations in a journal. In a compressed journal file system the journal holds compressed data. The ability to access the data randomly is accomplished by dividing the journal into blocks that use a separate dictionary. When an overwrite operation is performed, the overwrite operation of the data invalidates an old record and creates a hole in the journal. As a result, efficiency and productivity may he reduced.

In order to increase the efficiency and productivity, by closing the holes created by an overwrite operation on the records in the compressed journal file entries, the mechanisms of the illustrated embodiments apply a garbage collection process to close these holes by moving the data into new locations in the journal.

In one embodiment, selecting the best journal block for garbage collection is critical and the mechanisms perform the garbage collection on free blocks at the end of the file, allowing for the file to be truncated. Moreover, the mechanisms of the illustrated embodiments perform the garbage collection on blocks with minimal valid data, minimal valid record counts, and on blocks based upon the age of the blocks. In the current state of the art, only one of these conditions can be met with the existing algorithms.

In an alternative embodiment, the mechanisms create a new operation (e.g., create a new algorithm) for selecting the best block for garbage collection based upon the following; the free blocks at the end of a file, minimal valid data, minimal valid record count, the number of records in read cache, and the age of the blocks. The algorithm of the present invention is considerate of all the different conditions required for the selection. The selection may be performed by assigning a weighted value to each of the different conditions, as illustrated above, and enables real-time selection of garbage collection block, based on a data structure management. The new algorithm meets all the conditions described herein, and thus, enables truncating the file while maintaining efficiency while selecting the blocks with minimal data. Such processing allows for freeing more used space, reducing the number of IO required for the garbage collection, and completes the time based compression algorithm.

Figure 1:
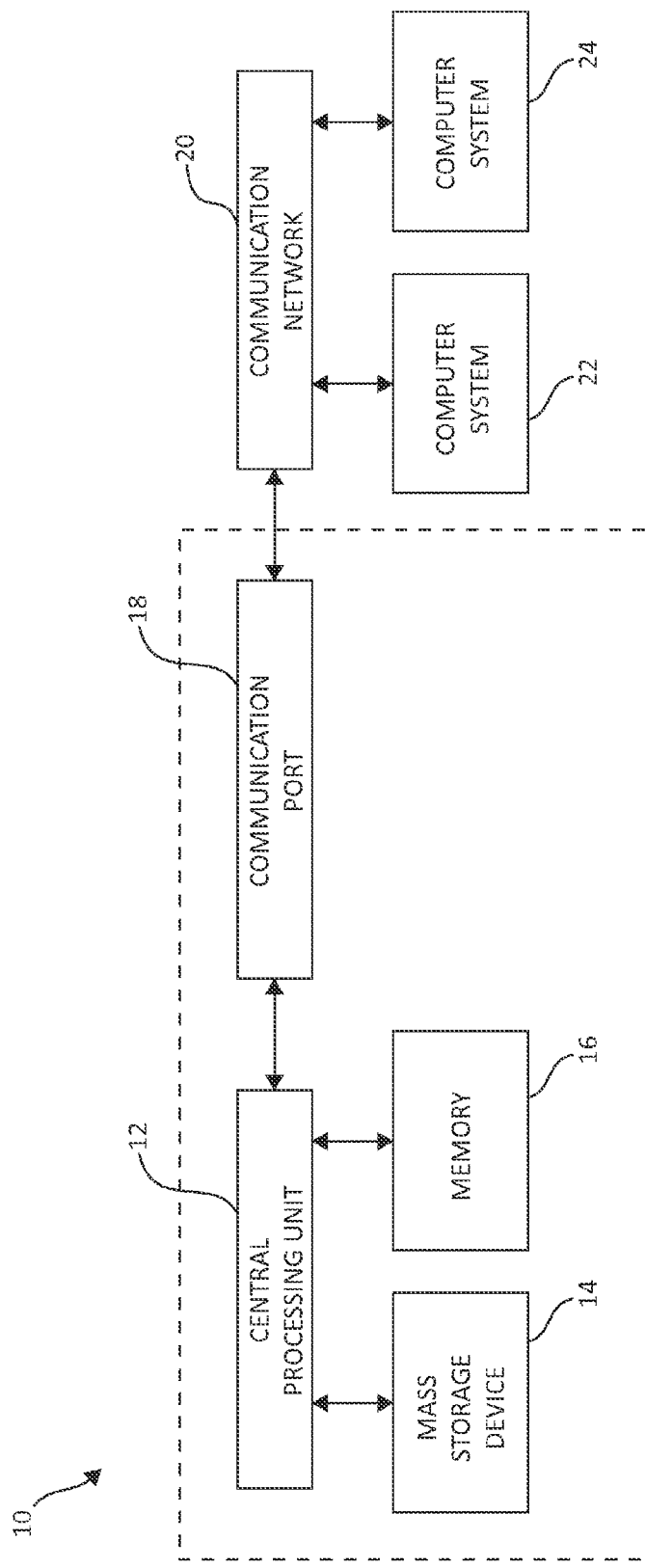
FIG. 1 illustrates a computing environment having an example storage device in which aspects of the present invention may be realized.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). The garbage collection operations further described may be executed on device(s) 14, located in system 10 or elsewhere. Memory device 16 may include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10 to execute and perform each operation described herein to accomplish the purposes of the present invention.

Figure 2:
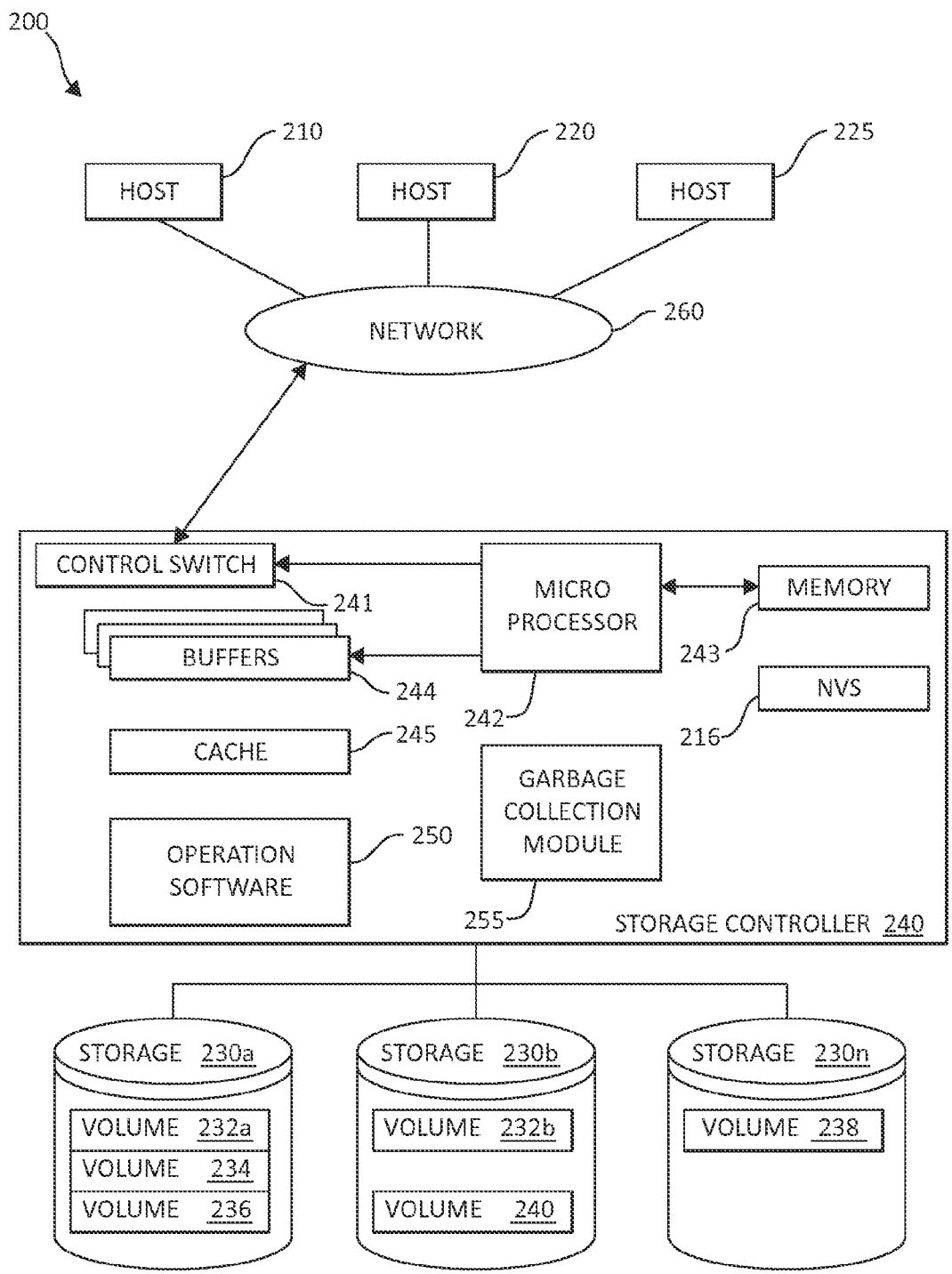
FIG. 2 illustrates an exemplary block diagram showing a hardware structure of a data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores the operation software 250, program instructions and data, which the processor 242 may access for executing functions and method steps associated with managing storage 230, and executing the steps and methods of the present invention. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a garbage collection module 255 to assist with garbage collection in a compressed journal file system. The garbage collection module 255 may work in conjunction with each and every component of the storage controller 240, the hosts 210, 220, 225, and storage devices 230. Both the garbage collection module 255 may be structurally one complete module or may be associated and/or included with other individual modules. The garbage collection module 255 may also be located in the cache 245 or other components of the storage controller 240 to accomplish the purposes of the present invention.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, and garbage collection module 255 in which information may be set. Multiple buffers 244 may be implemented with the present invention to assist with garbage collection in a compressed journal file system as described herein.

In one embodiment, the host computers or one or more physical or virtual devices, 210, 220, 225 and the storage controller 240 are connected through a network adaptor (this could be a fibre channel) 260 as an interface i.e., via a switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, and garbage collection module 255 are in communication with each other and may be separate or one individual component(s). Also, several, if not all of the components, such as the operation software 245 may be included with the memory 243 for performing garbage collection in a compressed journal file system. Each of the components within the devices shown may be linked together and may be in communication with each other for purposes suited to the present invention.

Figure 3:
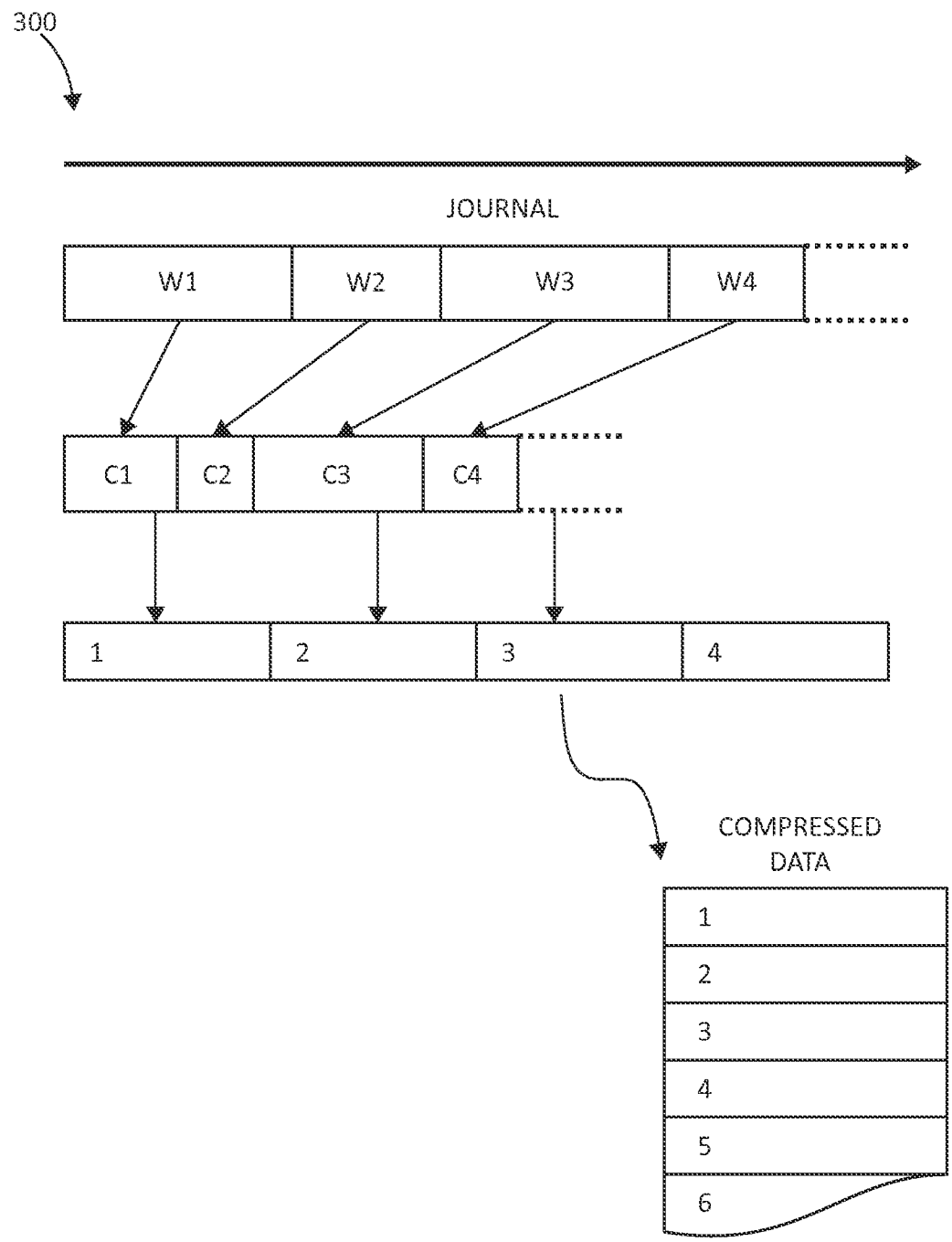
FIG. 3 illustrates an exemplary block diagram showing a compressed journal file system.

FIG. 3 illustrates an exemplary block diagram showing a compressed journal file system. In a data processing system, a journaling file system may be used to store the write operations in a journal, as shown by W1, W2, W3, and W4. The data is compressed as C1, C2, C3, and C4, which may then be stored in block segments 1, 2, 3, and 4. The ability to access the data randomly is done by dividing the journal into blocks that uses a separate dictionary. When an overwrite operation is performed, the overwrite operation of the data invalidates an old record and creates a hole in the journal, as illustrated by the compressed data block's 1 through 6. Block 6 depicts an overwrite operation of data invalidating an old record and creating a hole in the journal.

As mentioned previously, in order to increase the efficiency and productivity by closing the holes created by an overwrite operation on the records in the compressed journal file entries, the mechanisms of the illustrated embodiments apply a garbage collection process to close these holes by moving the data into a new location(s) in the journal.

FIG. 4 illustrates an exemplary block diagram showing garbage collection in a compressed journal file. In FIG. 4, part 1 depicts a full block of data with 5 separate segments. Segments 1, 2, 3, and 4, were originally written together into the block, so segments 1, 2, 3, and 4 will be in the cache. Part 2 illustrates an overwrite operation being performed on segment 2. Segments 1, 3, and 4 each need to be relocated, which may easily be achieved since segment 2 was recently modified and all segments that make up the block that contains segment 2 will be in the cache. Part 3 illustrates that the initial block is now a free block as a result of the original segments 1, 3, and 4 being relocated (e.g., grouped) with the input/output (I/O) of the write operation 85. It should be noted that only read operations insert data into read-cache.

To enable the selection of the block for garbage collection, as previously described, the mechanisms use the following data structures. First, each compression block in the journal file system may include the following metadata structure; the number of records, the size of each record, and the age of the overwritten block. Second, a map is configured to hold a list of blocks with overwritten records in the journal. Any partially filled data block may consist of valid compressed data logs and invalid (overwritten) data logs. Thus the mechanisms prefer to select data block with a minimal number of valid logs and a maximal size of the freed space. Hence, the key for the map consists of the number of valid records, represented by the variable x, the size of data in the valid records, represented by the variable y, the block position inside the physical file, represented by the variable z, and the weight of each of the map entries is calculated based on the key value is calculated according to: $(x+(y/x))*(z/range)$, where the range is the range of data blocks with the weighted conditions that are equivalent. The range corresponds to the file/volume range. The file/volume is divided into ranges, and each range is assigned a weighted value according to the distance from the range is from the origin. Unlike the standard allocation algorithms, that are used by garbage collection processes, regardless of the location that the garbage collection process will free in the data, the mechanism of the present invention seek to free data from the end of the blocks. The dimension Z, as mentioned above, is the relative block position to the end of the file, represented in the formula by Z. The dimension of "Z" is a biasing variable to select the data block with free space at the end of the file. The new algorithm uses garbage collection to free space and then the algorithm is used for allocating requested space.

To assist the mechanisms of the illustrated embodiments for effecting efficient garbage collection, the map is limited by size so the blocks with high number of valid records may not be inserted into the map. This enables the mechanisms of the present invention to apply more weight to age of the block and/or record and will support time based compression and its benefits. The age of the block is the time difference between the last overwrite operation and the current time. The age of the data block may be enforced outside of the weight formula. This is accomplished with by the weight of the specific data block being calculated every time the user overwrites any part of the data related to this block. Thus, the block map may consist of ranges of data blocks with the same weight. Any new block may be inserted in the specific weight range at the end of this group. The map enables the mechanisms to find the next block for garbage collection and eliminates the need to continuously calculate the weight of the conditions by the weighted formula because the block weight is calculated during an insert operation and the blocks are always arranged from low weight to high weight. By limiting the size of the block map, block with lower age (i.e. blocks that was overwritten earlier) are allowed to enter the map. Hence, the block position is important in the weight calculation and for the selection of the garbage collection process.

The selection of data blocks with free space at the end of a record/file enables the file to be truncated faster and reclaim the space to the file system. In a block based system, thin provisioning space reclamation may be also based on freeing space at the end of the logical unit. This unique effect on garbage collection weight calculation is distinctive for compression due to the space freeing that compression presents. For the garbage collection weight calculation, the mechanisms may also consider another condition/value of the data availability.

In one embodiment, the mechanisms perform the garbage collection on data blocks that are present in the read cache, which enables the data movement without the read input/output (I/O) operation required for fetching the data to be moved. However, the garbage collection operations may be performed for a block that is not available in the cache if the total weight, obtained from the weighted conditions, justifies the garbage collection. Ideally, it is preferable to perform the garbage collection on the partial data blocks with the same weight with data in the read cache, but the mechanisms may chose data blocks with weight above some threshold value for the garbage collection.

Figure 5:
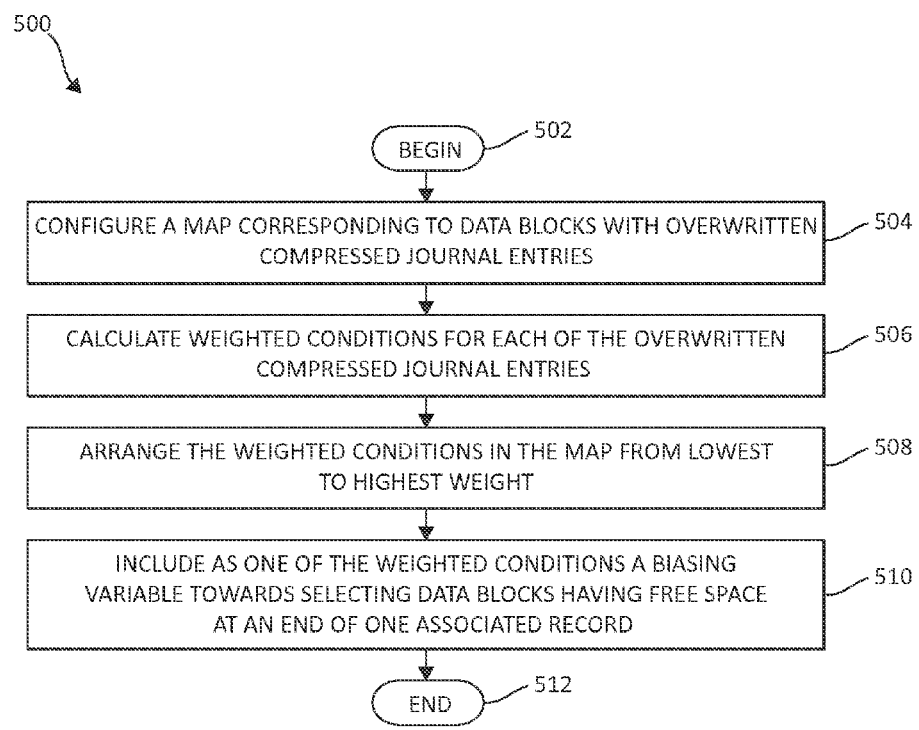
FIG. 5 is a flowchart illustrating an exemplary method for performing garbage collection in a compressed journal file.

FIG. 5 is a flowchart illustrating an exemplary method 500 for performing garbage collection in a compressed journal file. The method 500 begins (step 502) by configuring a map corresponding to data blocks with overwritten compressed journal entries (step 504). Weighted conditions for each of the overwritten compressed journal entries are calculated (step 506). These weighted conditions may include the number of valid records, the size of data in the valid records, and the block position inside the physical file. The weighted conditions in the map are arranged from the lowest to highest weight (step 508). The method 500 may include as one of the weighted conditions a biasing variable towards selecting data blocks having free space at an end of one associated record (step 510). The method 500 ends (step 512).

Figure 6:
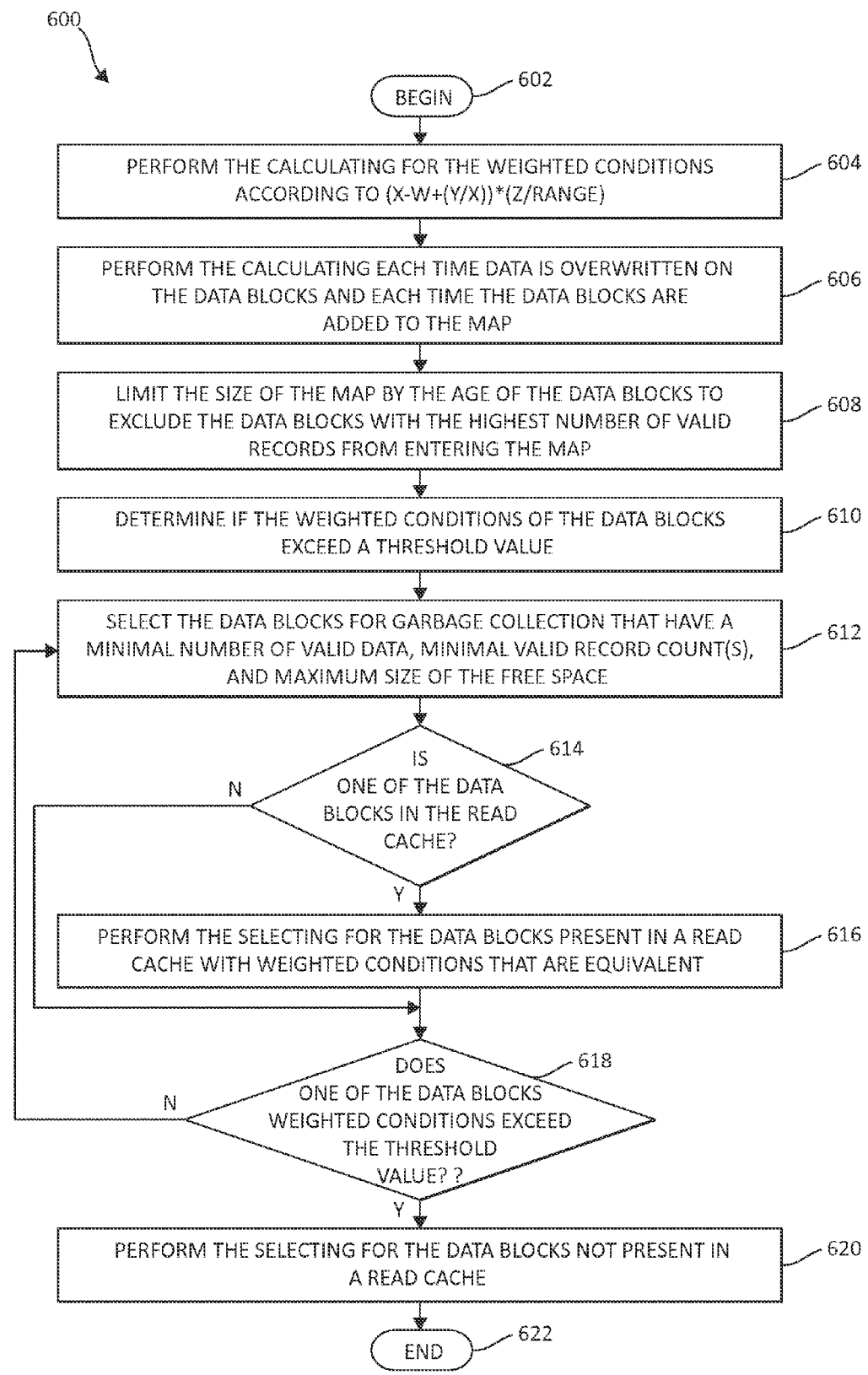
FIG. 6 is a flowchart illustrating an exemplary method for calculating weighted conditions with a biasing variable for selecting data blocks having free space at an end of a record.

FIG. 6 is a flowchart illustrating an exemplary method 600 for calculating weighted conditions with a biasing variable for selecting data blocks having free space at an end of a record. The method 600 begins (step 602) with performing the calculating for the weighted conditions according to $(x-w+(y/x))*(z/range)$ (step 604). The variable x is the number of valid records, y is the size of data in the valid records, z (which represents a third or new dimension) is the block position inside a file, and w is the number of records in read cache. The method 600 may perform the calculating each time data is overwritten on the data blocks and each time the data blocks are added to the map (step 606). The method 600 may limit the size of the map by the age of the data blocks to exclude the data blocks with the highest number of valid records from entering the map (step 608). The method 600 may determine if the weighted conditions of the data blocks exceed a threshold value (610). The data blocks for garbage collection, that have a minimal number of valid data, a minimal valid record count(s), and a maximum size of the free space, may be selected (612). The method 600 may determine if one of the data blocks is in a read cache (step 614). If yes, the method 600 may perform the selecting for the data blocks present in the read cache with weighted conditions that are equivalent in value (step 616). If no, the method 600 may determine if one of the data blocks' weighted conditions exceed a threshold value (step 618). If one of the data blocks' weighted conditions does not exceed a threshold value, the method 600 may return to (step 612) and select the data blocks for garbage collection that have a minimal number of valid data, a minimal valid record count(s), and a maximum size of the free space (step 612). If one of the data blocks' weighted conditions does exceed a threshold value, the method 600 may perform the selecting for the data blocks not present in a read cache (step 620). The method 600 ends (step 622).

In one embodiment, the mechanisms for performing efficient garbage collection in a compressed journal configure a map corresponding to data blocks with overwritten compressed journal entries. Weighted conditions are calculated for each of the overwritten compressed journal entries. The weighted conditions are arranged in the map from lowest to highest order. One of the weighted conditions may include a biasing variable towards selecting data blocks having free space at an end of at least one associated record.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for efficient garbage collection in a compressed journal file system by a processor device in a computing environment, the method comprising:
configuring a map corresponding to data blocks with overwritten compressed journal entries; and
calculating weighted conditions for each of the overwritten compressed journal entries, wherein the weighted conditions are arranged in the map from lowest to highest;
wherein one of the weighted conditions includes a biasing variable towards selecting data blocks having free space at an end of at least one associated record.

2. The method of claim 1, further including, performing the calculation for the weighted conditions according to:
$(x-w+(y/x))*(z/range)$, where w is a number of records in a read cache, x is a number of valid records, y is a size of data in the valid records, z is a relative position of the data block to the end of the at least one record, and range is the range of data blocks with the weighted conditions that are equivalent.

3. The method of claim 1, further including, limiting the size of the map by the age of the data blocks to exclude the data blocks with the highest number of valid records from entering the map, wherein the age of the block is a time difference between the last overwrite operation on the data block and a current time.

4. The method of claim 1, wherein the calculating is performed each time data is overwritten on the data blocks and each time the data blocks are added to the map, wherein the weighted conditions of the data blocks are arranged in the map from lowest to highest.

5. The method of claim 1, further including selecting the data blocks for garbage collection with a minimal number of valid data, minimal valid record count, and maximum size of the free space.

6. The method of claim 5, further including, in conjunction with the selection, determining if the weighted conditions of the data blocks exceed a threshold value.

7. The method of claim 6, further including, performing the selecting for the data blocks present in a read cache with weighted conditions that are equivalent.

8. The method of claim 7, further including, if one of the data blocks is not in the read cache, and if the one of the data blocks weighted conditions exceeds the threshold value, performing the selecting for one of the data blocks.

* * * * *